3,098,060
PREPARATION OF HIGH MOLECULAR WEIGHT POLYACRYLONITRILE WITH n-BUTYL LITHIUM AS CATALYST
Mary L. Miller, New York, N.Y., assignor to American Cyanamid Company, New York, N.Y., a corporation of Maine
No Drawing. Filed May 27, 1960, Ser. No. 32,073
2 Claims. (Cl. 260—88.7)

This invention relates to a new, low-temperature, rapid catalytic polymerization of certain vinyl monomers. More particularly, it relates to the polymerization of purified acrylonitrile and substituted acrylonitriles in the presence of a catalyst consisting of a lithium alkyl, the preferred alkyls being the ethyl thru hexyl derivatives while dissolved in toluene or similar solvents.

Acrylonitrile is usually polymerized through the formation of free radicals by a peroxidic catalyst or other compounds which will generate free radicals. The polymers prepared by this method have average molecular weights ranging between 50,000 and 300,000 with a rather wide molecular weight distribution. They are amorphous and usually contain a small amount of branching. When basic anionic-type initiators are employed, relatively low molecular weights of the order of 200 to 20,000 are usually obtained. Furthermore, these products are yellow and apparently have a high degree of cyanoethylation (ss Symposium on Makromolecules, Int. Union of Pure & Applied Chem., Wiesbaden, Germany, Oct. 12–17, 1959, Book III, p. IIIA7, and U.S. Patents 2,608,554–5, issued to O. H. Bullitt, Jr., August 26, 1952).

It is quite surprising and unexpected that lithium alkyls can be used to prepare the extremely high molecular weight (1,000,000) polymers of acrylonitrile since these compounds are extremely basic in character and would therefore be expected to act as the basic initiators disclosed in the above citations. Moreover, the products obtained by the present invention are extremely white which is clearly contrary to what is expected in view of the fact that strongly basic initiators yield yellowish products which are often soluble in solvents that do not normally dissolve polyacrylonitrile. The fact that ionic polymerizations in general are known to be very selective makes it impossible to accurately predict catalytic activity from the polymerization of other monomers.

An important feature of the invention is the fact that the acrylonitrile monomer must be added to the solvent-catalyst mixture since the reverse procedure has proved to be inoperative.

The reason for this phenomenon is unknown but if this procedure is not followed the reaction fails to proceed. Because many reaction mediums form a two phase system at the low reaction temperatures—the acrylonitrile separates from the solvent—and polar and semi-polar solvents cause chain transfer reactions which stunt molecular growth, the selection of the proper solvent is all important. I have found toluene to be the only practical solvent because of its non-polar character and that it dissolves the reaction components at the low temperatures.

Acrylonitrile dissolves in toluene at $-70°$ C. to give a homogeneous solution. This is important because if the solvent and monomer separate into two phases the polymerization would take place in the monomer layer only and the second liquid would confer no benefit. If the polymerization takes place in a homogeneous solution, there are the following advantages: (1) control of exotherm and rate of polymerization, (2) lowered chance of termination by monomer which would lower the molecular weight, (3) a less viscous medium so that the yields are better because of lowered gel-effect and (4) fewer side reactions, therefore, whiter polymer. At $-70°$ C. mixtures of acrylonitrile and aliphatic hydrocarbons, like hexane, heptane and petroleum ether, form two phases so that the above advantages are absent.

For example, a mixture consisting of 2.5 parts by volume of acrylonitrile and 25 parts of petroleum ether starts to separate into two phases at $-6°$ C. and has separated virtually completely at $-10°$ C.

It is believed that the advantages of this process result from the virtual elimination of chain termination by monomer because of the low temperature and the dilution by solvent. Chain termination is believed to be a major cause of low molecular weights at high temperatures.

Thus if impurities could be totally eliminated from solvent and monomer, the chains would be expected to grow until terminated by (1) quenching or (2) by lack of monomer or (3) by the gel effect (in excessive thickening of the medium). That is the polymer would be, essentially a "living polymer" in the sense of Szwarc, M. Levy, and R. Milkontch, J.A.C.S. 78, 2656 (1956).

The above explanation is merely volunteered as plausible and is not intended in anyway to limit the invention.

The invention is carried out in solution with toluene at very low temperatures which are necessary to give high molecular weights. At higher temperatures there are side reactions, yellowing, and often violent exotherm, lowered molecular weight and lowered yield. The vinyl monomer is first purified and thoroughly dried and cooled to the desired temperature, preferably $-70°$ C. ($-60$ to $-80°$ C. being the optimum) in an oxygen-free atmosphere wherein is added from 0.03 to 1.0% by weight of the lithium alkyl based on the weight of the monomer. Polymerization also occurs at $0°$ C. or above and as low as $-100°$ C. The amount of catalyst is not critical in that polymerization occurs with less than 0.01% and is only governed at the upper limit by practicality; excessive amounts of catalyst cause increased exotherm whereby side reactions take place. The polymerization is usually terminated after about 3–5 hours. However, as the temperature is lowered, the reaction time increases.

Examples of substituted acrylonitrile are the alkyl substituted, which includes methacrylonitrile.

The following examples are given by way of illustration to aid in the understanding of the invention and not to be construed as limiting the invention in any way. When not otherwise expressed, all amounts are given as parts by weight.

EXAMPLE I

To 28 parts of pure dry, oxygen-free toluene at room temperature are added 0.0064 part of n-butyl lithium as a 1.6 molar solution in heptane. The mixture is cooled to $-70°$ C. and 1.6 parts of precooled pure dry, oxygen-free acrylonitrile are added rapidly with agitation. The polymer gel is formed immediately. After three days at $-70°$ C. the polymerization is stopped by stirring in 200 parts of a mixture, which is made up of 100 parts of moist acetone and 0.2 part of concentrated HCl. This coagulates the polymer, which is filtered, washed with water and acetone and air dried. The yield is 91%, the polymer is white and the molecular weight is 940,000.

Other examples are carried out by the same procedure but using different amounts of monomer and catalyst and different polymerization times are shown in Table I.

*Table I*

THE POLYMERIZATION OF ACRYLONITRILE WITH n-BUTYL LITHIUM

| Ex. # | Parts Acrylonitrile | Parts Toluene | Parts n-butyl lithium | Temp., °C. | Time of Polymerization | Yield percent | Mol. Wt. $\times 10^{-3}$ |
|---|---|---|---|---|---|---|---|
| 2 | 11 | 30 | 0.0256 | −70 | 3 days | 63 | 760 |
| 3 | 4 | 26 | 0.0064 | −70 | 3 days | 78 | 1,300 |
| 4 | 7.2 | 26 | 0.0097 | −70 | ½ hr | 56 | 630 |
| 5 | 1.6 | 26 | 0.0128 | −70 | 1 hr | 70 | 410 |
| 6 | 1.6 | 26 | 0.0032 | −70 | 3 days | 17 | 1,350 |
| 7 | 1.6 | 26 | 0.0192 | −70 | 5 mins | 31 | 380 |
| 8 | 8 | 26 | 0.0064 | −70 | 10 mins | 37 | 695 |
| 9 | 4 | 26 | 0.0064 | −70 | 15 mins | 32 | 880 |
| 10 | 1.6 | 26 | 0.0126 | 0 | 1 hr | 40 | [1] 85 |

[1] Yellow.

Polyacrylonitrile has various properties which make it a highly desirable material for plastics, fibers and so forth. It is highly resistant to common organic solvents; it is chemically inert and it has a high softening point. When acrylonitrile is polymerized by the present method the white polymer which is formed is more regular in structure. This increased regularity is manifested by a narrowing of the haloes when examined by X-ray diffraction. The more regular structure and presumed freedom from branching makes this polymer especially good for fibers and films. The most outstanding property of this polymer is its high molecular weight which ranges from 400,000 to over 1,000,000 and is obtained in a very narrow molecular weight distribution, which is especially unusual for such high molecular weights. Careful fractionation of the polymer in Example I showed that 47.5% of the polymer was in the molecular weight range of 900,000 and 1,050,000.

The polymers are always obtained with at least 40% by weight of the polymer which falls within a molecular weight range, the upper and lower limits of which do not differ by more than 200,000; more often they differ by only about 100,000.

In addition to their unusual adaptability to fiber forming the partially hydrolyzed polymer may be advantageously employed in drilling muds, used as thickening agents and in some instances function as an anticoagulant.

In purifying the monomer for the present invention, various means may be employed to remove the oxygen and acid containing impurities together with any moisture which may be present. Applicant has found that a particularly effective method is to distill the monomer over metallic sodium or calcium hydride.

The molecular weight of the polymers of acrylontrile were determined by the measurement of intrinsic viscosity in dimethyl formamide at 30° C. Viscosities were related to molecular weight using the equation of C. L. Cleland and W. Stockmeyer, J. Polymer Science 17, 473 (1955) which relates intrinsic viscosity to weight average molecular weight. This relationship has been confirmed by light scattering measurements by applicant herself.

I claim:

1. A method of producing a white homopolymer of acrylonitrile having a molecular weight of at least 400,000 which comprises polymerizing dry, oxygen-free acrylonitrile at a temperature of from about −50° C. to about −100° C. in a single phase polymerization solution consisting essentially of toluene and from about 0.01% to about 1.0%, by weight, based on the weight of said monomer, of butyl lithium, said polymerization being effected by adding the said acrylonitrile monomer to the said toluene-butyl lithium solution.

2. A method of producing a white homopolymer of acrylonitrile having a molecular weight of at least 400,000 which comprises polymerizing dry, oxygen-free acrylonitrile monomer at a temperature of from about −60 C. to about −80° C. in a single phase polymerization solution consisting essentially of toluene and from about 0.01% to about 1.0%, by weight, based on the weight of said monomer, of butyl lithum, said polymerization being effected by adding the said acrylonitrile monomer to the said toluene-butyl lithium solution.

References Cited in the file of this patent

UNITED STATES PATENTS

| 2,426,719 | Watkins | Sept. 2, 1947 |
| 2,608,554 | Bullitt | Aug. 26, 1952 |
| 2,608,555 | Bullitt | Aug. 26, 1952 |

OTHER REFERENCES

Frankel et al., Chemical Society Journal (London), 1959, pt. 4 (Dec.), pages 3858–3864.